(12) United States Patent
Matei et al.

(10) Patent No.: US 11,152,846 B2
(45) Date of Patent: Oct. 19, 2021

(54) METHOD AND APPARATUS FOR PROVIDING ADAPTIVE INDUCTOR PEAK CURRENT IN DC-DC CONVERTER

(71) Applicant: Apple Inc., Cupertino, CA (US)

(72) Inventors: Bogdan-Eugen Matei, Munich (DE); Alessandro S. Molari, Eichenau (DE); Angelo Bassi, Munich (DE); Fabio Ongaro, Unterhaching (DE); Giovanni Saccomanno, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/743,443

(22) Filed: Jan. 15, 2020

(65) Prior Publication Data

US 2021/0218343 A1  Jul. 15, 2021

(51) Int. Cl.
*H02M 3/156* (2006.01)
*H02M 1/00* (2006.01)
*H02M 3/158* (2006.01)
*H02M 3/155* (2006.01)

(52) U.S. Cl.
CPC ......... *H02M 1/0032* (2021.05); *H02M 3/156* (2013.01); *H02M 3/158* (2013.01); *H02M 3/1566* (2021.05); *H02M 1/0035* (2021.05); *H02M 3/1552* (2021.05); *H02M 3/1555* (2021.05)

(58) Field of Classification Search
CPC . H02M 2001/0032; H02M 2001/0035; H02M 1/4225; H02M 2003/1552; H02M 2003/1566; H02M 3/156; H02M 1/0032; H02M 3/1566; H02M 1/0035
See application file for complete search history.

(56) References Cited

U.S. PATENT DOCUMENTS

| 7,746,042 | B2 | 6/2010 | Williams et al. |
| 9,479,072 | B2 | 10/2016 | Dillersberger |
| 9,520,788 | B2 | 12/2016 | Kobayashi |
| 9,621,036 | B2 | 4/2017 | Wibben |
| 9,923,468 | B2 | 3/2018 | Paul et al. |
| 10,033,279 | B2 | 7/2018 | Chen et al. |
| 10,103,720 | B2 | 10/2018 | Childs et al. |
| 2006/0043953 | A1* | 3/2006 | Xu ........................ H02M 3/156 323/282 |

(Continued)

*Primary Examiner* — Alex Torres-Rivera
(74) *Attorney, Agent, or Firm* — Kowert, Hood, Munyon, Rankin & Goetzel, P.C.; Erik A. Heter (57) ABSTRACT

A DC-DC converter providing adaptive peak current control is disclosed. A DC-DC converter includes an inductor having first and second terminals coupled to a voltage source and a transistor, respectively. The DC-DC circuit further includes a control circuit configured to control activation of the transistor. A first control block of the control circuit controls the transistor (and thus the inductor peak current) using pulse frequency modulation (PFM). A second control block controls the transistor using pulse width modulation (PWM) and PFM. In a first mode of operation, the control circuit activates the transistor, using PFM, such that the peak-to-peak current through the inductor has a fixed value. In a second mode of operation, the control circuit activates the transistor such that the peak-to-peak current through the inductor is modulated, using both PWM and PFM.

20 Claims, 5 Drawing Sheets

(56) References Cited

U.S. PATENT DOCUMENTS

| | | | |
|---|---|---|---|
| 2013/0002224 A1* | 1/2013 | Lin | H02M 1/36 |
| | | | 323/285 |
| 2015/0061624 A1* | 3/2015 | Lalithambika | H02M 3/156 |
| | | | 323/282 |
| 2015/0091544 A1* | 4/2015 | Jayaraj | H02M 3/156 |
| | | | 323/284 |
| 2018/0131274 A1* | 5/2018 | Chen | H02M 3/156 |
| 2019/0081546 A1 | 3/2019 | Hsu et al. | |

* cited by examiner

METHOD AND APPARATUS FOR PROVIDING ADAPTIVE INDUCTOR PEAK CURRENT IN DC-DC CONVERTER

BACKGROUND

Technical Field

This disclosure is directed to electronic circuits, and more particularly, to DC-DC converters.

Description of the Related Art

Voltage regulators are commonly used in a wide variety of electronic systems in order to provide a desired voltage to particular circuits. To this end, a wide variety of voltage regulator circuits are available to suit various applications. Linear voltage regulators are used in a number of different applications in which the available supply voltages exceed an appropriate value for the circuitry to be powered. Another type of voltage regulator is a switched-mode voltage regulator, more commonly referred to a switching power supply, or alternatively, a DC-DC converter. Switching power supplies can be subdivided into two categories, buck converters and boost converters. A buck converter, from its supply to its load, steps down an input voltage, while stepping up current. A boost converter, from its supply to its load, steps up the input voltage while stepping down the current.

A basic switching power supply includes a switch and an energy storage element (such as an inductor). Operation in a basic switching power supply includes an on state (e.g., when the switch is in a first position) and an off state (e.g., when the switch is in a second position). During the on state, the energy storage element begins to store energy. For example, when the energy storage element is an inductor, current increases and responsive thereto, the inductor produces an opposing voltage across its terminals. During the off state, the switch is open and the inductor becomes a current source. Over time, the changing voltage of the switching power supply is averaged out to a substantially DC voltage.

SUMMARY

A DC-DC converter providing adaptive peak current control is disclosed. In one embodiment, a DC-DC converter include an inductor having first and second terminals coupled to a voltage source and a transistor, respectively. The DC-DC circuit further includes a control circuit configured to control activation of the transistor. A first control block of the control circuit controls the transistor (and thus the inductor peak current) using pulse frequency modulation (PFM). A second control block controls the transistor using pulse width modulation (PWM) and PFM. In a first mode of operation, the control circuit activates the transistor, using PFM, such that the peak-to-peak current through the inductor has a fixed value. In a second mode of operation, the control circuit activates the transistor such that the peak-to-peak current through the inductor is modulated, using both PWM and PFM.

In one embodiment, the control circuit may, during operation in the first mode, selectively activate and deactivate the transistor such that the current pulses through the inductor has both a substantially fixed amplitude and a fixed pulse width. In the second mode of operation, the control circuit may activate and deactivate the transistor such that current pulses through the inductor have a variable width and a variable amplitude. The control circuit may activate and deactivate the transistor based on a feedback voltage (that corresponds to an output voltage of the DC-DC converter), a first threshold voltage, and a second threshold voltage.

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element.

Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to a DC-DC converter. In certain applications, the conversion efficiency at low currents is a key parameter. Accordingly, operation may be optimized in order to reduce power losses and increase the efficiency. One major source of power losses in certain types of DC-DC converters are inductor core losses, which depend in significant part on inductor ripple current, which is described in the Steinmetz equation used to calculate the total power loss (core losses) per unit volume in magnetic materials when subjected to external sinusoidally varying magnetic flux. Another source of power loss is the DC resistance of the inductor, which depends quadratically on the inductor current.

Regulation of peak inductor current, used in pulse frequency modulation (PFM) control include using fixed inductor peak current and fixed on time of the transistor of the DC-DC converter. Providing a fixed inductor peak current, each PFM pulse has a fixed peak current used to charge the inductor, irrespective of the input voltage value. In providing a fixed on time of the transistor, the PFM pulse (which is provided by activating the transistor) has a fixed duration. This results in a substantially fixed peak current depending on the input voltage. These methods modulate only the switching frequency (transistor on time and off time) to accommodate the current demanded by a load circuit coupled to the DC-DC converter. However, at low load current, the core losses and ohmic losses can be significant, thereby reducing efficiency.

The present disclosure includes, under certain operating conditions, modulation of the peak current of a PFM pulse in, e.g., a boost converter, instead of directly modulating the frequency. This in turn may result in an indirect change of the switching frequency when the current slopes are substantially fixed. In one embodiment, these slopes may be defined by the following equations:

$$\text{Slope\_ON} = V\_in/L \quad \text{(Eq. 1)},$$

$$\text{Slope OFF} = (V\_out + Vd - V\_in)/L \quad \text{(Eq. 2)},$$

where V_in is the input voltage to the DC-DC converter, L, is the inductance of the inductor, V_out is the output voltage of the DC-DC converter, and Vd is a voltage across the diode of the DC-DC converter.

At very low PFM load currents, control of the transistor is still performed by changing the switching frequency. Above the low range (as discussed further below and illustrated in the drawings), modulation of the peak current (and thus the pulse width) is performed. In the medium range, the desired peak efficiency may be attained.

Accordingly, in various embodiments, the DC-DC converter discussed herein includes a control circuit that controls the activation and deactivation of the transistor, and thus the current pulses. A first control block of the control circuit is arranged for PFM operation in a first mode, and switches the transistor such that the frequency is modulated while the pulses have a fixed peak-to-peak inductor current and a fixed width. A second control block arranged for a combination of PFM operation and pulse width modulation (PWM) operation in a second mode. In the second mode, the transistor may be activated and deactivated such that the current pulses through the inductor are modulated in terms of both peak-to-peak current and pulse width. Various embodiments of such a DC-DC converter are now discussed in further detail.

Figure 1:
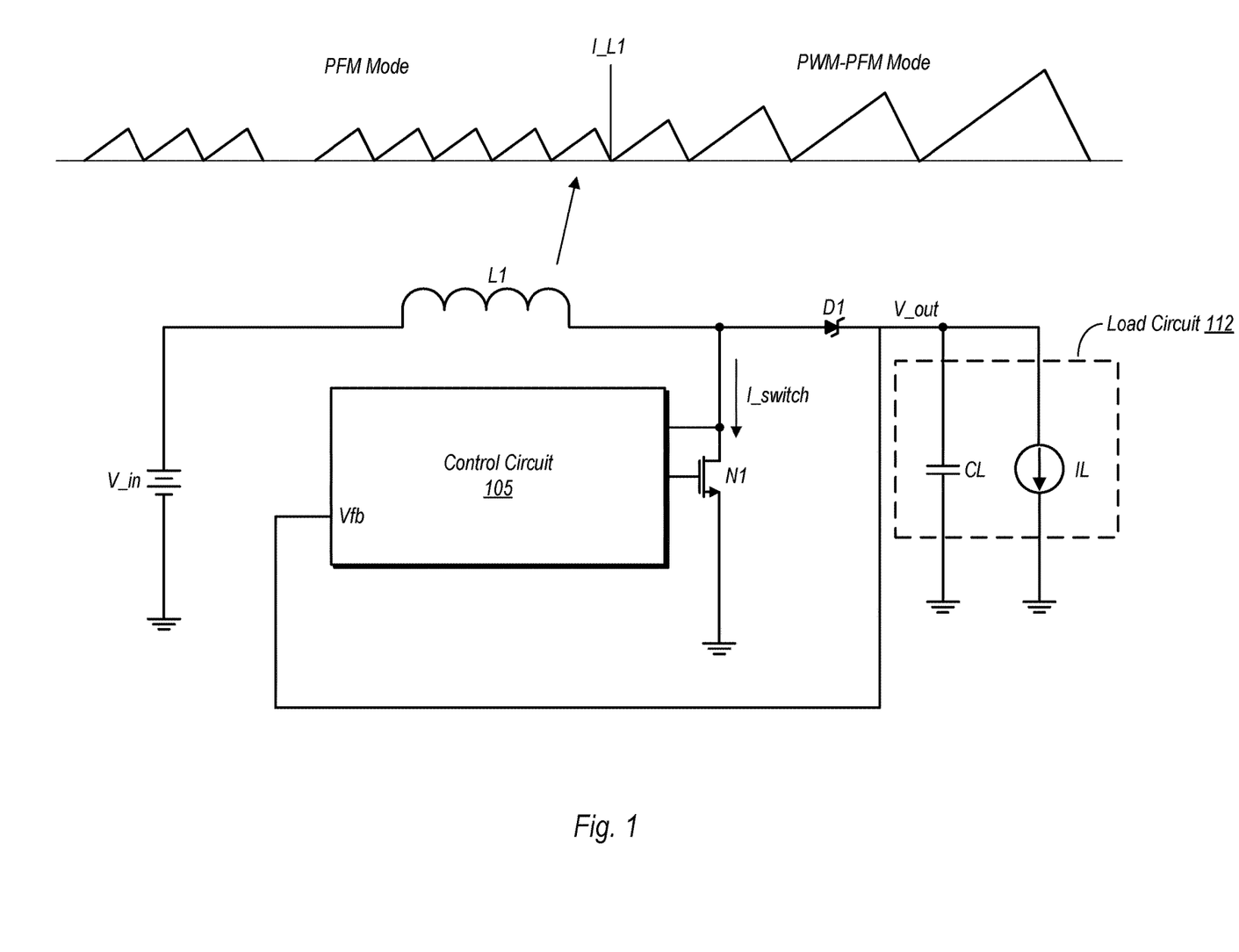
FIG. 1 is a block diagram of one embodiment of a DC-DC converter.

FIG. 1 is a diagram illustrating one embodiment of a DC-DC converter. In the embodiment shown, DC-DC converter 100 is a boost converter that provides an output voltage, V_out, that is greater than the input voltage, V_in. It is noted however that the methodology of operation of DC-DC converter 100 as described herein is not limited to boost converters, and may also be applied to buck converters if desirable for a given application.

In the embodiment shown, input voltage source V_in is coupled to one terminal of an inductor L1. The other terminal of L1 is coupled to a drain terminal of transistor N1, and an anode of diode D1 (which is a Schottky diode in this embodiment). The cathode of D1 is coupled to the output node of DC-DC converter where the output voltage, V_out, is provided. In the embodiment shown, DC-DC converter 100 is coupled to a load circuit 112, which is represented here by a load capacitance CL and a demand current, IL.

DC-DC converter 100 includes a control circuit 105. A feedback voltage, Vfb is provided to control circuit 105 and is used in its operation. In the embodiment shown, the feedback voltage Vfb is taken directly from the output voltage node and is thus equivalent to V_out. However, embodiments are possible and contemplated in which the feedback voltage is scaled, and thus some type of scaling circuitry may be implemented in the feedback loop. Control circuit 105 is also coupled to receive a switch current, I_switch, which is indicative of the current through inductor L1.

Based on the received feedback voltage, Vfb, and the switch current, I_switch, control circuit 105 may activate and deactivate transistor N1. In various embodiments, control circuit 105 may operate in different modes. These modes include a pulse frequency modulation (PFM) mode and a combined pulse width modulation (PWM) and PFM mode.

When operating in the PFM mode, control circuit may modulate the frequency of current pulses through inductor L1, switching N1 on and off accordingly. In the PFM mode, the on time for transistor N1 may be substantially the same for each current pulse. As a result, the peak-to-peak current may remain substantially the same for all pulses. Furthermore, the width of each of the pulses may be substantially the same, since Slope_ON and Slope_OFF (as described by Equations 1 and 2 above) are each equal for each pulse.

Operation in the PFM mode is graphically illustrated in the upper portion of FIG. 1, which shows an example of the current, I_L1, through the inductor L1. As shown in the left hand portion of the graphic (under the label 'PFM Mode'), each of the pulses has substantially the same amplitude and substantially the same width. The frequency of the pulses may be changed depending on the current demanded by load circuit 112. Generally speaking, frequency of pulses may increase as the demanded current increases when operating in the PFM mode. When demand current is great enough, the spacing between the pulses may decrease to zero. At lower demand currents, the spacing between pulses, and thus the frequency of the pulses (which may be provided in bursts), may vary. As will be discussed in further detail below, the frequency of pulses may depend at least in part on the feedback voltage.

When operating in the PWM-PFM mode, control circuit 105 may activate and deactivate transistor N1 such that both the amplitude and width of the current pulses are modulated and thus variable, depending on the demanded load current. Accordingly, in this mode, the peak-to-peak current of pulses through the inductor are variable. As a consequence of this variation, the frequency of pulses may also vary.

Graphically, operation in the PWM-PFM mode is shown in the right-hand side of the graphic illustration in the upper portion of FIG. 1. As shown, the pulses in this mode vary in both amplitude and width. Larger pulses may correspond to higher values of demand current from the load. However, unlike operation in the PFM mode, there is effectively no spacing between the pulses at any time during operation in this mode.

Figure 2:
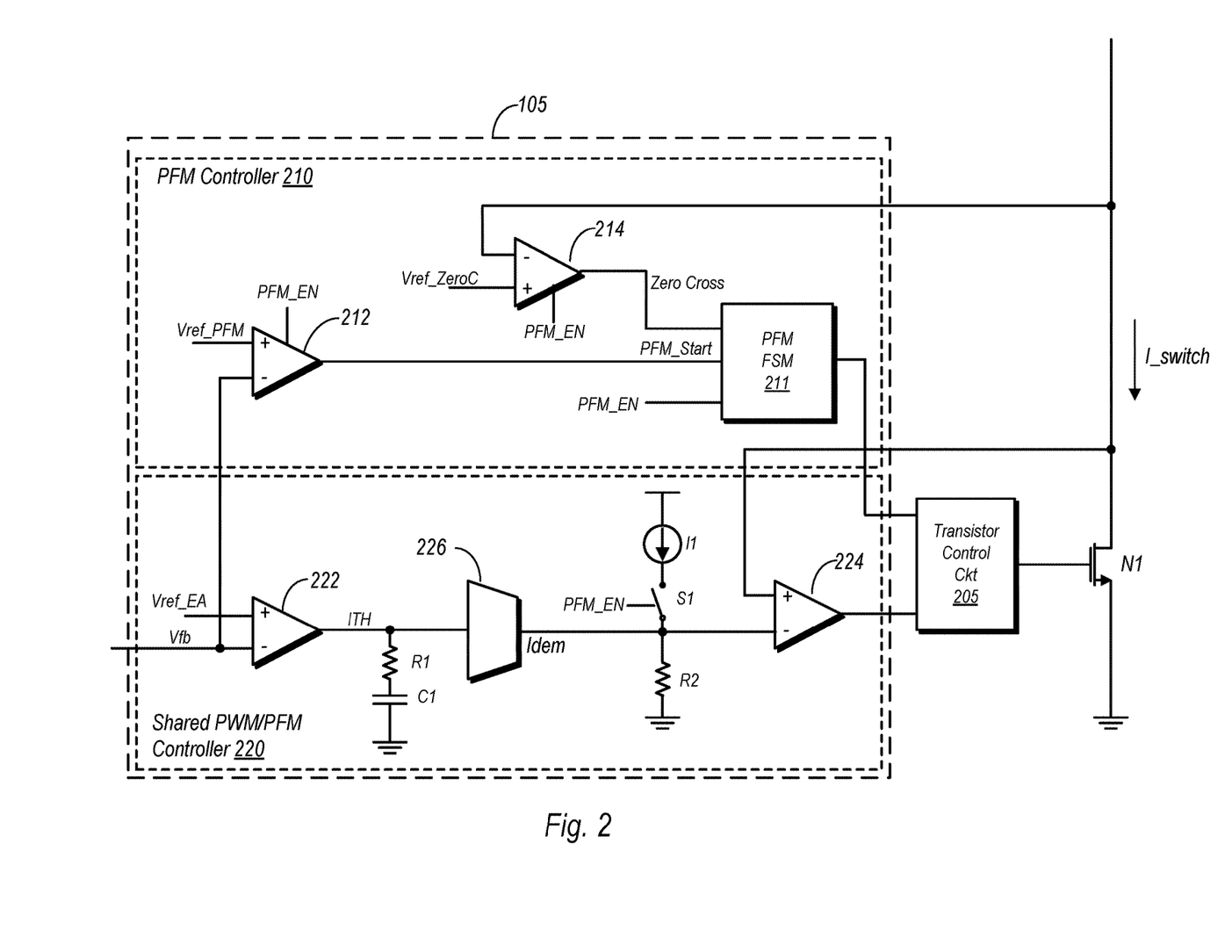
FIG. 2 is a diagram of one embodiment of a control circuit used in a DC-DC converter.

FIG. 2 is a diagram of one embodiment of a control circuit used in a DC-DC converter. In the embodiment shown, control circuit 105 includes two different control blocks. A first control block is PFM controller 210, which causes the PFM operation. The second control block is the shared PWM/PFM controller 220, which performs control functions in the PWM-PFM mode of operation. PFM controller 210 may operate based in part on a first threshold voltage, Vref_PFM, while the PWM-PFM controller 220 may operate based in part on a second threshold voltage, Vref_EA (which is less than Vref_PFM in this embodiment). These threshold voltages may be generated by suitable voltage reference circuitry (e.g., bandgap circuits) which are not explicitly shown here for the sake of simplicity.

Both PFM controller 210 and Shared PWM/PFM controller output correspondingly generated signals to transistor control circuit 205. In turn, transistor control circuit 205 may accordingly activate or deactivate transistor N1. In one embodiment, transistor control circuit 205 may be implemented using, e.g., an SR (set-reset) flip-flop, although other types of circuitry may be used in other embodiments. In general, any circuitry that can activate and deactivate transistor N1 in accordance with the control signals generated by PFM controller 210 and Shared PWM-PFM controller 220 may be used to implement transistor control circuit 205.

PFM controller 210 in the embodiment shown includes a PFM comparator 212, a zero crossing comparator 214, and a PFM finite state machine (FSM) 211. PFM comparator 212 in the embodiment shown compares the reference voltage Vref_PFM to the feedback voltage, Vfb. When the feedback voltage is greater than the PFM reference voltage, PFM comparator 212 outputs a low signal, 'PFM_Start', to PFM FSM 211. As a result of the low PFM_Start signal, PFM FSM 211 outputs a corresponding signal to transistor control circuit 205, which may cause transistor N1 to be inactive due to the condition of Vfb>Vref_PFM. On the other hand, when Vfb<Vref_PFM (indicating that the output voltage, V_out, is falling), PFM comparator 212 may assert the PFM_Start signal. Responsive to assertion of the PFM_Start signal and the Zero Cross signal, PFM FSM 211 may output the corresponding signal such that transistor control circuit 205 activates transistor N1. When the output of comparator 224 becomes asserted, transistor N1 may be turned off, even if the PFM_Start remains asserted. However, the continued assertion of PFM_Start may allow for multiple, consecutive current pulses to be sourced through inductor L1, with the next pulse being sourced upon completion of the pulse immediately prior thereto.

When the feedback voltage Vfb is persistently less than the PFM reference voltage, but persistently greater than the error amplifier reference voltage (Vref_EA), PFM comparator 212 may hold PFM_Start asserted. As a result, PFM FSM 211 will cause transistor control circuit 205 to switch the state of transistor N1 as soon as one pulse ends, thereby beginning the next pulse.

PFM controller 210 also includes the previously mentioned zero crossing comparator 214, which is coupled to receive the current I_switch on a first input and a zero crossing reference voltage, Vref_ZeroC (which may be generated by any suitable voltage reference generating circuit) on a second input. When the voltage on the drain of transistor N1 (indicative of the current I_switch) falls below the threshold indicated by zero crossing reference voltage, the Zero Cross signal is asserted. When the Zero Cross signal is asserted, PFM FSM 211 causes transistor N1 to be activated if this device is currently off. This may occur when the current through the inductor L1, I_L1 (as graphically illustrated in FIG. 1) has reached zero at the end of the descending slope. As a result of turning on N1, the drain voltage may fall from V_out+Vd to the value given by the current flowing through N1 and its on resistance.

As shown in FIG. 2, PFM comparator 212, PFM FSM 211, and zero crossing comparator 214 are each coupled to receive an enable signal, PFM_EN. This signal may be provided by control circuitry that is not shown here. Normally, the PFM_EN signal may be asserted to enable PFM operation. However, if PFM operation is not desired at a given time, the control circuitry may de-assert the PFM-EN signal, thereby disabling PFM operation.

Shared PWM/PFM controller 220 in the embodiment shown is includes an error amplifier 222 which is coupled to receive the feedback voltage and a threshold/reference voltage Vref_EA. Error amplifier 222 may respond to the relative magnitudes of these signals by generating an error signal proportional to their difference. The error signal, ITH, is frequency compensated by the circuit implemented using resistor R1 and capacitor C1. Transconductance circuit 226 is coupled to the output of error amplifier 222. Based on the error signal ITH, transconductance circuit 226 generates a signal Idem that is a voltage that is indicative of a current demanded by the load circuit. This signal is provided to one input of PWM comparator 224. This node is also coupled to resistor R2, and, when switch Si is closed (responsive to assertion of the PFM_EN signal), a reference current I1. This may impose a minimum PFM peak current.

PWM comparator 224 is also coupled to receive the drain voltage from transistor N1, which is indicative of the current I_Swtich through this device. This signal is a voltage that is indicative of the present current being supplied to the inductor L1. Accordingly, when the current presently being supplied to the inductor L1 is greater than the demand current, as indicated by Idem, PWM comparator outputs a high. This may occur during operation in the PFM mode, and at certain times in the PWM-PFM mode. When the demand current is greater than the current provided to the inductor L1, PWM comparator may output a low signal. When in PWM-PFM mode, the output from PFM_Start, and thus from PFM FSM 211, may remain high. Accordingly, transistor control circuit 205 may activate transistor N1 under these conditions. Transistor N1 may remain active until the current provided to the inductor L1, as indicated by I_Switch, is at least equal to the current demanded by the load, as indicated by Idem. When this occurs, PWM comparator may assert its output signal and thus transistor N1 may be turned off. Transistor control circuit 205 may hold transistor N1 inactive until the current has fallen a sufficient amount and the output of PWM comparators 224 falls low and the Zero Cross signal is high. Thereafter, transistor control circuit 205 may once again activate transistor N1.

Figure 3:
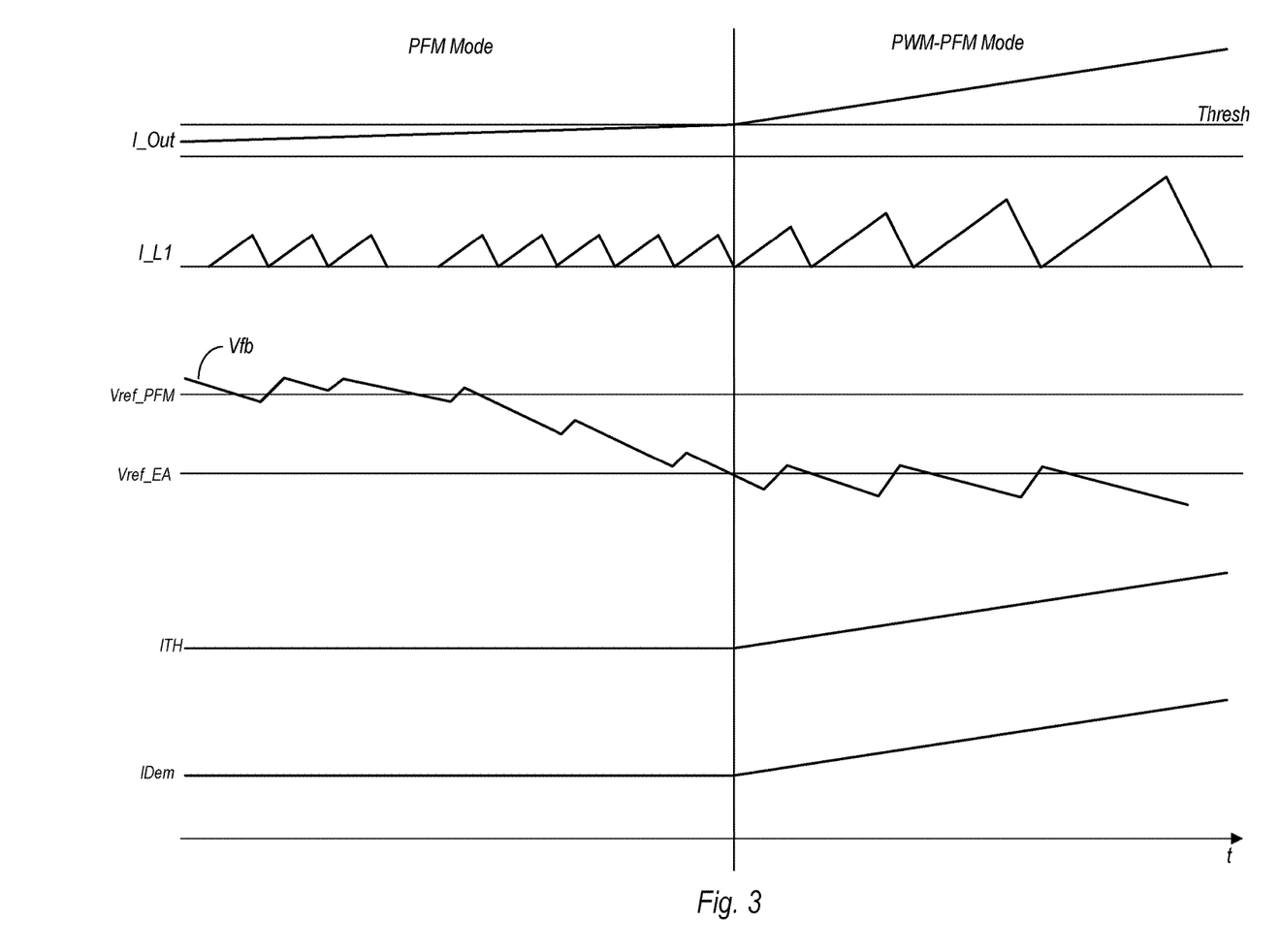
FIG. 3 is a graphic illustration of the operation of one embodiment of a DC-DC converter.

FIG. 3 illustrates, in graphic format, operation of the control circuit 105 discussed above, and thus the operation of DC-DC converter 100. More particularly, FIG. 3 illustrates operation of an embodiment of the control circuitry illustrated in FIG. 2 and discussed above in reference thereto, and further illustrates the effect on the output current.

As shown in FIG. 3, the delineation between the PFM mode and the PWM-PFM mode may be based on the output current, I_Out. Below a certain threshold of I_Out ('Thresh' as illustrated here) the control circuit may be considered to be operating in the PFM mode. Above this threshold, the circuit may be considered to be operating in the PWM-PFM mode.

Current through inductor L1, I_L1, is provided in the PFM mode as series of pulses that are substantially equal in both magnitude and duration. These pulses are caused by activations of the transistor N1 in the embodiment of FIG. 2. Transistor N1 remains active until the inductor current I_L1 reaches its peak, which is fixed in PFM mode. The frequency at which transistor N1 is activated, and thus at which pulses occur, is dependent in this particular embodiment on the relationship between the feedback voltage and a first threshold voltage, Vref_PFM. Generally speaking, the greater the amount of time that Vfb exceeds Vref_PFM, the lower the frequency of causing pulses during operation in the PFM mode. Similarly, the amount of time Vfb falls below Vref_PFM, the greater the frequency of causing pulses during PFM mode operation. The output current of the DC-DC converter, I_Out, also rises correspondingly.

When Vfb is persistently less than Vref_PFM while also persistently greater than Vref_EA, there is effectively no spacing between the pulses, with one pulse beginning as soon as the previous pulse ends. Accordingly, transistor control circuit 205 activates transistor N1 as soon as the previous pulse has completed.

In the illustrated example, once Vfb falls below the threshold voltage Vref_EA, operation switches to the PWM-PFM mode. When in this mode, the duration and amplitude of pulses is variable. Accordingly, the peak-to-peak inductor current is also variable. Furthermore, upon completion of one pulse, the next pulse begins in this mode. Generally speaking, the greater the amount of time that Vfb is less than Vref_EA, the greater both the duration and amplitude of the current pulses. This is due in part to the increasing values of ITH (the error signal output by error amplifier 222) and Idem (the signal output from transconductance circuit 226). These signals are indicative of the current demanded by the load circuit coupled to the DC-DC converter. Corresponding to the increase in duration and amplitude of the pulses (and thus, the increase in peak-to-peak current), the output current, I_Out also increases.

Thus, as shown in FIG. 3, when in PFM mode, the current pulses through inductor L1 have a fixed peak-to-peak value and fixed duration, while the output current can be varied by varying the frequency at which pulses are provided. When in PWM-PFM mode, the current pulses through inductor L1 are variable in amplitude, duration, and frequency (and thus the peak-to-peak value is also variable). Accordingly, varying the output current I_Out may be varied by varying these quantities.

Figure 4:
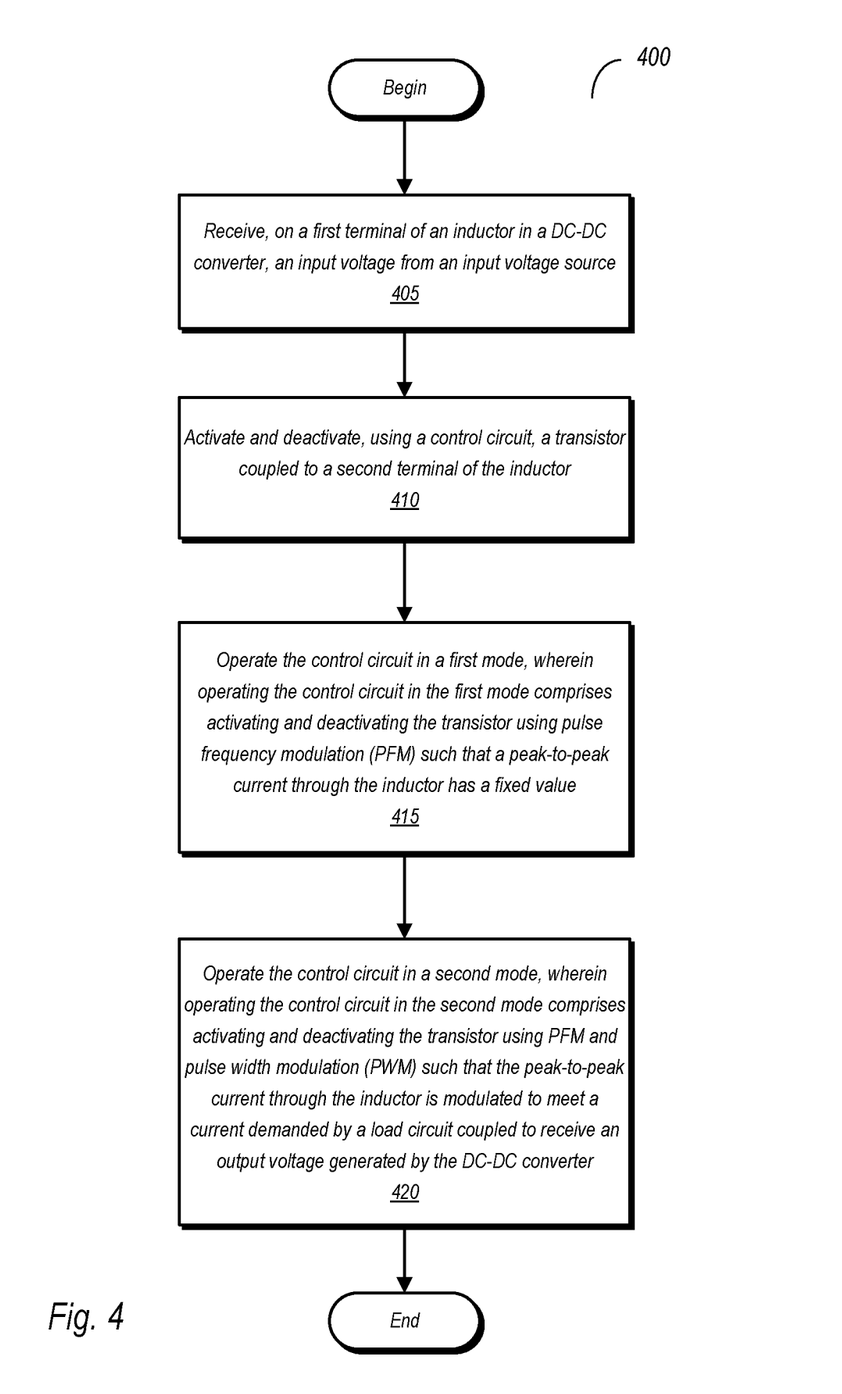
FIG. 4 is a flow diagram of one embodiment of a method for operating a DC-DC converter.

FIG. 4 is a flow diagram illustrating one embodiment of a method for operating a DC-DC converter. Method 400 may be performed using various embodiments of the DC-DC converter discussed above. Embodiments of a DC-DC converter capable of carrying out method 400 may also fall within the scope of this disclosure.

Method 400 includes receiving, on a first terminal of an inductor in a DC-DC converter, an input voltage from an input voltage source (block 405). The method further includes activating and deactivating, using a control circuit, a transistor coupled to a second terminal of the inductor (block 410). Activating and deactivating the transistor includes operating the control circuit in the first mode comprises activating and deactivating the transistor using pulse frequency modulation (PFM) such that a peak-to-peak current through the inductor has a fixed value (block 415). Operating the control circuit in the second mode comprises activating and deactivating the transistor using PFM and pulse width modulation (PWM) such that the peak-to-peak current through the inductor is modulated to meet a current demanded by a load circuit coupled to receive an output voltage generated by the DC-DC converter (block 420).

In various embodiments, operating in the first mode includes receiving, at the control circuit, a feedback signal based on the output voltage generated by the DC-DC converter and a comparator in a PFM portion of the control circuit comparing a voltage of the feedback signal to a reference voltage. The control circuit may cause activation of the transistor responsive to the comparator determining that the voltage of the feedback signal being is less than the reference voltage. The control circuit may also deactivate the transistor responsive to the comparator determining that the voltage of the feedback signal is greater than the reference voltage.

Operating in the second mode, in various embodiments, includes receiving, at the control circuit, a feedback signal based on the output voltage generated by the DC-DC converter. An error amplifier in a shared PFM-PWM portion of the control circuit may generate an error signal based on a difference between a voltage of the feedback signal and a reference voltage. Based on the error signal, the method includes generating, using a transconductance circuit, a first signal indicative of an amount of current demanded by a load coupled to the DC-DC converter. A comparator in the control circuit compares the first signal to a second signal indicative of an amount of current being supplied to the load circuit. Based on the results of the comparing, the method includes controlling a state of the transistor. Controlling the state of the transistor includes activating the transistor responsive to the comparator determining that the amount of current demanded by the load exceeds the amount of current supplied to the load circuit. Controlling the state of the transistor also includes deactivating the transistor responsive to the comparator determining that the amount of current demanded by the load is equal to or greater than the amount of current supplied to the load circuit. When operating in the second mode, an amplitude and a pulse width of a current pulse is proportional to a difference between the amount of current demanded by the load circuit and the amount of current presently supplied to the load circuit.

Figure 5:
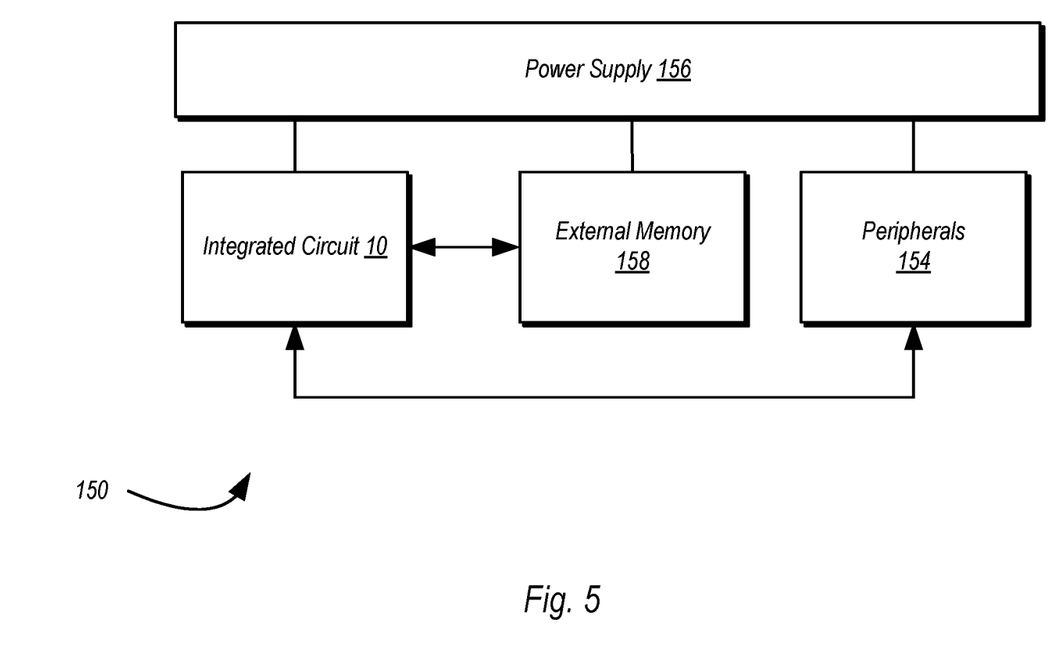
FIG. 5 is a block diagram of one embodiment of an example system.

Turning next to FIG. 5, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

In various embodiments, one or more components of system 150 may include one or more instances of a DC-DC converter as discussed above. For example, peripherals 154 may include a display having a backlight that is powered by an embodiment of a DC-DC converter of the present disclosure. Other instances of the DC-DC converter disclosed herein may be implemented in, e.g., integrated circuit 10, among other places. Generally speaking the DC-DC converter of the disclosure may be utilized in any suitable application.

Numerous variations and modifications will become apparent to those skilled in the art once the above disclosure is fully appreciated. It is intended that the following claims be interpreted to embrace all such variations and modifications.

What is claimed is:

1. A circuit comprising:
   an inductor having a first terminal coupled to an input voltage source;
   a transistor coupled between a second terminal of the inductor and a ground node; and
   a control circuit configured to control activation of the transistor, the control circuit comprising a first control block configured to control the transistor using pulse frequency modulation (PFM), and a second control block configured to control the transistor using pulse width modulation (PWM) and PFM;
   wherein, during operation in a first mode, the control circuit is configured to control the transistor, using PFM, such that a peak-to-peak current through the inductor has a fixed value, and wherein, during operation in a second mode, the control circuit is configured to modulate the peak-to-peak current through the inductor, using PWM and PFM, wherein the control circuit is configured to cause operation in one of the first and second modes based at least in part on a comparison of a feedback voltage to a first threshold and a second threshold and further configured to cause an increase of the peak-to-peak current through the inductor based on an amount of time the feedback voltage is less than the second threshold.

2. The circuit of claim 1, wherein the first control block includes:
   a first comparator configured to output a first signal in a first state when the feedback voltage is less than a first reference voltage and further configured to output the first signal in a second state when the feedback voltage is greater than the first reference voltage, the first reference voltage corresponding to the first threshold;
   a second comparator configured to output a second signal in the first state when a voltage on a drain terminal of the transistor is less than a zero crossing threshold and output the second signal in the second state when the voltage on the drain terminal of the transistors is greater the zero crossing threshold; and
   a finite state machine configured to provide a corresponding control signal to a gate control circuit based on respective states of the first and second signals, wherein the gate control circuit is configured to control the transistor.

3. The circuit of claim 1, wherein the second control block includes:
   an error amplifier configured to generate an error signal based on the feedback voltage and a reference voltage corresponding to the second threshold;

a transconductance circuit configured to output a current signal based on the error signal;
a comparator configured to provide a corresponding control signal to a gate control circuit based on the current signal and a current through the transistor.

4. The circuit of claim 1, wherein the circuit comprises a DC-DC converter, wherein the control circuit is coupled to receive the feedback voltage, wherein the feedback voltage is based on an output voltage provided by the DC-DC converter.

5. The circuit of claim 1, wherein the first control block is configured to cause current pulses through the inductor at the fixed value and at a persistent frequency when the feedback voltage is persistently less than the first threshold and persistently greater than the second threshold.

6. The circuit of claim 1, wherein the first control block is configured to generate pulses of a same width and a varying frequency when operating in the first mode.

7. The circuit of claim 1, wherein the second control block is configured to vary a width and a frequency of pulses when operating in the second mode.

8. A method comprising:
receiving, on a first terminal of an inductor in a DC-DC converter, an input voltage from an input voltage source;
activating and deactivating, using a control circuit, a transistor coupled to a second terminal of the inductor;
operating the control circuit in a first mode based on a feedback signal and a first reference voltage, wherein operating the control circuit in the first mode comprises activating and deactivating the transistor using pulse frequency modulation (PFM) such that a peak-to-peak current through the inductor has a fixed value; and
operating the control circuit in a second mode based on the feedback signal, the first reference voltage, and a second reference voltage that is less than the first reference voltage, wherein operating the control circuit in the second mode comprises activating and deactivating the transistor using PFM and pulse width modulation (PWM) such that the peak-to-peak current through the inductor is modulated to meet a current demanded by a load circuit coupled to receive an output voltage generated by the DC-DC converter, wherein operating in the second mode comprises the control circuit causing an increase of the peak-to-peak current through the inductor based on an amount of time a voltage of the feedback signal is less than the second reference voltage.

9. The method of claim 8, wherein operating in the first mode comprises:
receiving, at the control circuit, the feedback signal at a value based on the output voltage generated by the DC-DC converter;
a comparator in a PFM portion of the control circuit comparing the voltage of the feedback signal to the first reference voltage;
the control circuit causing activation of the transistor responsive to the comparator determining that the voltage of the feedback signal is less than the first reference voltage; and
deactivating the transistor responsive to the comparator determining that the voltage of the feedback signal is greater than the first reference voltage.

10. The method of claim 8, wherein operating in the second mode comprises:

receiving, at the control circuit, the feedback signal at a voltage based on the output voltage generated by the DC-DC converter;
an error amplifier in a shared PFM-PWM portion of the control circuit generating an error signal based on a different between a voltage of the feedback signal and the second reference voltage;
generating, using a transconductance circuit and based on the error signal, a first signal indicative of an amount of current demanded by a load coupled to the DC-DC converter;
comparing, using a comparator, the first signal to a second signal indicative of an amount of current being supplied to the load circuit; and
controlling a state of the transistor based on results of said comparing.

11. The method of claim 10, wherein operating in the second mode further includes:
activating the transistor responsive to the comparator determining that the amount of current demanded by the load exceeds the amount of current supplied to the load circuit; and
deactivating the transistor responsive to the comparator determining that the amount of current demanded by the load is equal to or greater than the amount of current supplied to the load circuit.

12. The method of claim 10, wherein, when operating in the second mode, an amplitude and a pulse width of a current pulse is proportional to a difference between the amount of current demanded by the load circuit and the amount of current presently supplied to the load circuit.

13. An apparatus comprising:
a load circuit coupled to receive a supply voltage; and
a DC-DC converter configured to generate the supply voltage including:
an inductor coupled to receive an input voltage on a first terminal;
a transistor having a drain terminal coupled to a second terminal of the inductor; and
a control circuit configured to control selectively activate and deactivate the transistor in accordance with operation in a first mode and a second mode, wherein, during operation in the first mode, the control circuit is configured to, based on a first threshold voltage, activate and deactivate the transistor such that pulses of current through the inductor have a fixed width and a fixed peak-to-peak value, and wherein during operation in the second mode, the control circuit is configured to, based on a second threshold voltage less than the first threshold voltage, activate and deactivate the transistor such that pulses of current through the inductor have a variable width and a variable amplitude and further configured to cause an increase of the peak-to-peak current through the inductor based on an amount of time a feedback voltage is less than the second threshold voltage.

14. The apparatus of claim 13, wherein the control circuit includes:
a pulse frequency modulation (PFM) controller configured to control current through the inductor based in part on the feedback voltage and the first threshold voltage;
a shared controller coupled to the PFM controller and configured to control current through the inductor based in part on the feedback voltage, the first threshold voltage, and the second threshold voltage.

15. The apparatus of claim 14, wherein the PFM controller includes a comparator configured to assert an output signal responsive to the feedback voltage falling below the first threshold voltage.

16. The apparatus of claim 14, wherein the PFM controller is configured to vary an output current provided by the DC-DC converter by varying a frequency of the pulses of current through the inductor.

17. The apparatus of claim 14, wherein the shared controller includes:
- an error amplifier configured to generate an error signal based on a difference between the feedback voltage and a second threshold voltage, wherein the error signal is indicative of an amount of current demanded by the load circuit; and
- a comparator configured to compare a demand current signal based on the error signal to a signal indicative of an amount of current currently being supplied to the load circuit.

18. The apparatus of claim 17, wherein the shared controller includes a transconductance circuit configured to generate the demand current signal based on the error signal.

19. The apparatus of claim 14, wherein the shared controller is configured to vary an output current provided by the DC-DC converter by varying amplitude, width, and frequency of the pulses of current through the inductor.

20. The apparatus of claim 14, wherein the PFM controller includes a zero crossing comparator configured to assert a zero cross signal in response to determining that the current through the inductor has fallen to zero.

* * * * *